United States Patent [19]

Boudigues

[11] 4,376,375
[45] Mar. 15, 1983

[54] MULTIPLE FLOW TURBOJET WITH ADJUSTABLE BYPASS RATIO

[75] Inventor: Serge Boudigues, Sceaux, France

[73] Assignee: Societe Nationale d'Etude et de Construction de Moteurs d'Aviation S.N.E.C.M.A., Paris, France

[21] Appl. No.: 169,465

[22] Filed: Jul. 16, 1980

[30] Foreign Application Priority Data

Jul. 16, 1979 [FR] France .................... 79 18317

[51] Int. Cl.³ ............................................. F02K 3/06
[52] U.S. Cl. .................................... 60/226.3; 60/262
[58] Field of Search ................. 60/226 R, 226 B, 262

[56] References Cited

U.S. PATENT DOCUMENTS

| | | | |
|---|---|---|---|
| 3,368,352 | 2/1968 | Hewson | 60/226 R |
| 3,486,328 | 12/1969 | Boudigues | 60/226 R |
| 4,054,030 | 10/1977 | Pederson | 60/226 B |

Primary Examiner—Douglas Hart
Attorney, Agent, or Firm—Oblon, Fisher, Spivak, McClelland & Maier

[57] ABSTRACT

A multiple-flow turbojet with adjustable bypass ratio comprising a low pressure spool and a high pressure spool casing. Aerodynamic surfaces mechanically integral with the high pressure spool are disposed in a cold secondary flow whose characteristics vary as a function of the setting of a guide means and cause a variation in the bypass ratio.

6 Claims, 7 Drawing Figures

MULTIPLE FLOW TURBOJET WITH ADJUSTABLE BYPASS RATIO

BACKGROUND OF THE INVENTION

1. Field of the Invention

The invention relates to a bypass turbojet engine (single or twin spool) with separate or mixed flows in which the development of the bypass ratio as a function of flight conditions is tied to the flight cycle. Fuel proportions or nozzle parameters have little effect on this development.

Moreover, at speeds of supersonic flight the bypass ratio increases, while it would be highly desirable that it decrease so as to achieve maximum thrust for a given engine size.

2. Description of the Prior Art

There are known bypass turbojet engines in which the bypass ratio is modified as a function of flight conditions; in these turbojets, however, the turbine located in the secondary flow is subjected to the action of hot gases.

SUMMARY OF THE INVENTION

The present invention makes it possible to vary the bypass ratio over a wide range for any given speed of flight.

Thus, optimum fuel consumption or thrust per unit of gas flow can be achieved.

In accordance with the present invention, aerodynamic surfaces mechanically integral with the high pressure spool are disposed in a cold secondary flow whose flow rate and pressure characteristics vary as a function of the setting of a rotatable guide vanes and cause a variation in the bypass ratio.

In accordance with the present invention and in contrast to earlier devices, the turbine located behind the adjustable guide vanes is a turbine that is always cold, which facilitates the fabrication of the rotatable guide vanes and simplifies the problem of sealing the cold flow from the hot flow.

It will also be noted from a thermodynamic viewpoint that the disposable energy for which one can adjust the portion transferred from one spool to the other is not thermal energy but cold energy, i.e. energy of pressure due to the fact that the secondary flow is supercompressed.

Finally, in the known prior art, the absence in the secondary flow of aerodynamic surfaces mechanically connected to the high pressure spool makes the speed for this spool practically independent of the setting of the guide vanes. Moreover, in the known devices, the means of adjusting the setting of the guide vanes are provided merely to adapt the cross-section of the guide vanes to the heating rate of the secondary flow, and there is no mention that it can be adjusted in the absence of heating, since this would offer no advantage.

Moreover, while it is known how to mount a turbine in the secondary flow of a turbojet, in the known case the air turbine is connected only to a free compression spool and it is not connected to the high pressure spool as in the present application.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
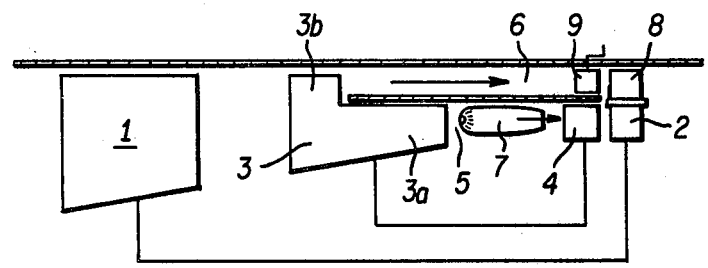
FIG. 1 is a half view in longitudinal section of a turbojet in accordance with the invention, with double flow through the high pressure spool, in which the secondary flow is expanded as it transfers energy to the low pressure spool.

FIG. 1 represents a bypass turbojet with a low pressure spool constituted by a single or multi-stage low pressure blower 1 driven by a low pressure turbine 2 and a high pressure spool constituted by a single or multi-stage bypass compressor 3 driven by a high pressure turbine 4.

An internal annular passage 5 is traversed by the primary flow and an external annular passage 6 is traversed by the secondary flow; the internal passage 5 traversed by the primary flow contains a portion $3a$ of the high pressure compressor, a combustion chamber 7 and turbines 4 and 2.

The portion $3b$ of the high pressure compressor supercompresses the secondary flow in passage 6 before expanding it in cold turbine 8 located at the periphery of the low pressure turbine blades 2. Upstream of the cold turbine 8 is located a set of adjustable guide vanes 9.

The energy furnished by the high pressure turbine 4 is proportional to:

$$C_p \Delta_2 T + \lambda C_p \delta T$$

wherein:
- $\Delta_2 T$ is temperature increase in the primary flow between the inlet and outlet of compressor 3,
- $\delta T$ is temperature increase in the secondary flow between the inlet and outlet of compressor part $3b$ in FIG. 1, and
- $\Delta_2 T$ and $\delta T$ relate only to the high pressure spool.

The $\lambda C_p \delta T$ portion of this mechanical energy is partially, totally (or even more) returned to the low pressure turbine 2. The proportioning of this transfer of potential and non-thermal energy, as it is known, is effected by means of the adjustable setting of the guide vanes 9 of the cold turbine 8.

In point of fact, in a standard twin-spool, by-pass turbojet engine, (a) the total flow is determined by $N_1$ (rate of rotation of the low pressure spool) and (b) the total primary flow is determined by $N_2$ (rate of rotation of the high pressure spool).

There exists an equation $N_2 = f(N_1, Z, M, \alpha)$ which for every altitude Z, for every Mach number M and for a given position $\alpha$ of the fuel control lever, determines for every $N_1$ value an $N_2$ value and, in accordance with the foregoing, determines a ratio between the primary and secondary flows. But in the known types of turbojets, the high pressure spool has no physical contact with the secondary flow and, consequently, all the adjustment parameters for the characteristics of the secondary flow are without appreciable influence on the high pressure spool.

By contrast and in accordance with the invention, the turbojet comprises a high pressure spool which features a physical contact with the secondary flow.

In the embodiment of FIG. 1, this physical contact is obtained by the compressor 3b.

As a consequence, the variable energy transfer (achieved by adjusting the setting of the guide vanes of the cold turbine 8) from the low pressure spool to the high pressure spool, is accompanied by a variation in the rate of rotation $N_2$ of the high pressure spool, as a function of the rate of rotation $N_1$ of the low pressure spool with:

$$N_2 = g(N_1, Z, M, \alpha, \theta)$$

$\theta$ being the setting of the rotatable guide vanes 9. When the setting $\theta$ is changed, the characteristics (flow rate, pressure) of the secondary flow are modified; the presence in this secondary flow of an aerodynamic surface mechanically tied to the high pressure spool results in high effectiveness of setting $\theta$ on the rate of rotation $N_2$ of the high pressure spool and, consequently, of the primary flow.

In this manner, a high rate $N_1$ makes it possible to achieve powerful thrusts, while a high rate $N_2$ makes possible good specific fuel consumption.

Figure 2:
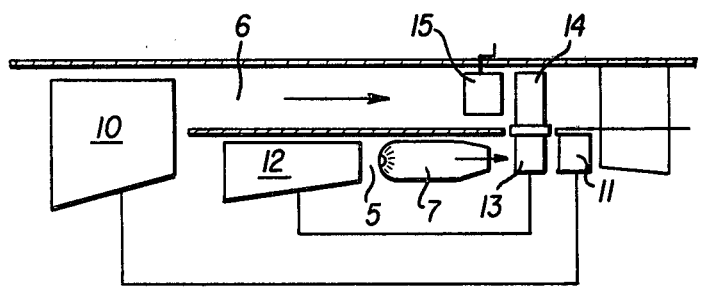
FIG. 2 is a half view in longitudinal section of a turbojet in which the secondary flow is expanded while furnishing energy to the high pressure spool.

FIG. 2 represents another embodiment of the turbojet in which the low pressure spool is constituted by a bypass compressor 10 which is driven by a low pressure turbine 11. The high pressure spool is constituted by a single flow, high pressure compressor 12 which is driven by a high pressure turbine 13.

The high pressure turbine 13 is provided at its periphery with a cold turbine 14 located in the passage 6 for the secondary flow and preceded by a variable setting guide vanes 15.

The secondary flow is supercompressed in the low pressure compressor 10 and expanded in the cold turbine 14 located at the periphery of the blades of the high pressure turbine. As in the preceding example, there is indeed a physical contact between the secondary flow and the high pressure turbine.

The energy transfer from one spool to the other is thus assured and permits, as in the preceding case, considerable variation in the adjustment of the bypass ratio for any given flight condition.

In this case, it is the high pressure turbine 13 which receives from the secondary flow a potential energy greater than needed for the confluence of the flow.

This energy supplement is picked up in its totality (or more) by the cold turbine 14 integral with the high pressure turbine.

There is thus an energy transfer which, in this case, goes from the low pressure spool to the high pressure spool.

Figure 3:
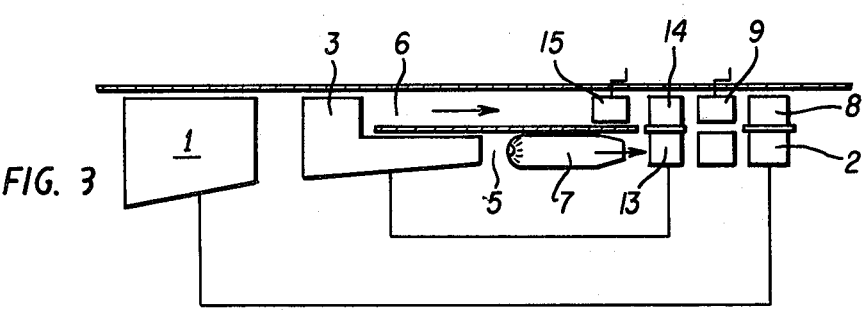
FIG. 3 is a half view in longitudinal section of a turbojet comprising a combination of the characteristics of the turbojets shown in FIGS. 1 and 2.

FIG. 3 represents a turbojet in which the low pressure compressor or blower 1 is driven by a turbine 2 and the high pressure, bypass compressor 3 is driven by a turbine 13, as in the embodiment represented in FIG. 1.

On the turbines 2 and 13 are mounted at the periphery of the blades two cold turbines 8 and 14 which are provided, respectively, with guide vanes 9 and 15.

This thus involves a combination of the embodiments represented in FIGS. 1 and 2 and in which the high pressure spool features a physical contact with the secondary flow by means of the compressor 3 and the high pressure turbine 13.

Figure 4:
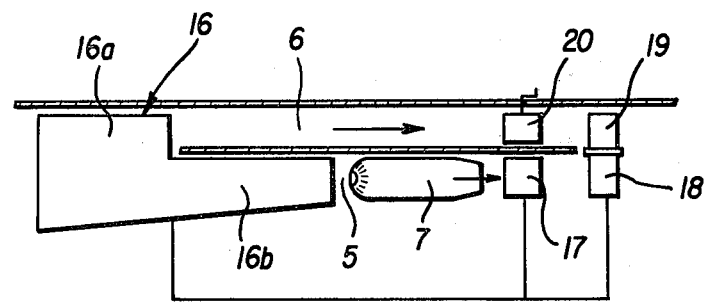
FIG. 4 is a half view in longitudinal section of a double flow, single spool, turbojet.

FIG. 4 represents a single spool, bypass turbojet engine which is constituted by a bypass compressor comprising a high pressure portion 16b and a low pressure portion 16a which is driven by a two stage turbine 17, 18; turbine 18 is provided at its periphery with a cold turbine 19 which is located in the secondary flow passage 6, said turbine 19 having upstream therefrom a guide vanes 20 with adjustable settings.

As there is only one spool, rate $N_2$ = rate $N_1$, and the setting angle $\theta$ of guide vanes 20 is without effect on the law of rotation speeds $N_2 = f(N_1)$. In reality, a variation of the angle $\theta$ is accompanied by a variation in the operating conditions and thus in the bypass ratio.

There is still a variable transfer of energy from the secondary flow to the primary flow, but there is no transfer from one spool to another since there is only one spool.

In consequence, the single spool can be regarded as a high pressure spool. It is clear that the influence of the angle $\theta$ in this embodiment is weaker than in the preceding cases.

Figure 5:
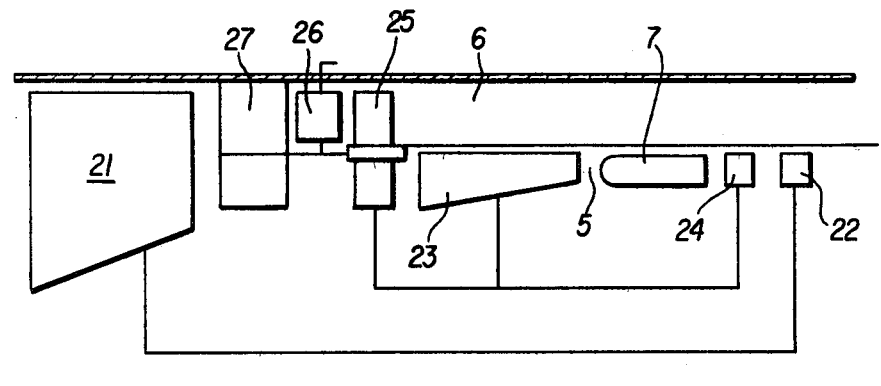
FIG. 5 is a half view in longitudinal section of a turbojet in which the cold turbine is located upstream of the high pressure compressor.

FIG. 5 represents a turbojet which comprises a bypass, low pressure compressor 21 which is driven by a turbine 22, and a high pressure compressor 23 driven by a turbine 24.

A cold turbine 25 is located upstream of the high pressure compressor 23 and is mechanically connected to the high pressure spool comprising the compressor 23. The cold turbine 25 is provided upstream with a guide vanes 26 with adjustable settings. The element 27 located between the compressor 21 and the turbine 25 is used as a structural support component and not as an aerodynamic component.

Figure 6:
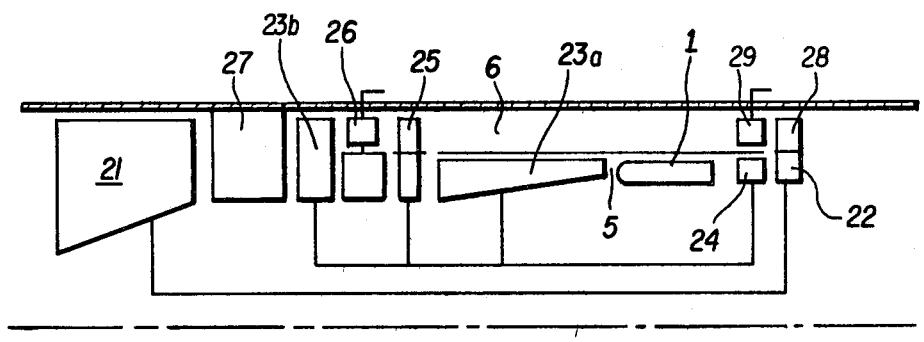
FIG. 6 is a half sectional view of an embodiment of the turbojet shown in FIG. 5 and in which a cold turbine is located at the periphery of the low pressure turbine.

FIG. 6 represents a combination of the embodiments represented in FIGS. 5 and 1.

As shown in FIG. 6, the turbojet engine has a low pressure compressor 21 directly driven by a turbine 22 and a high pressure compressor having two portions (23a, 23b) mechanically independent of the compressor 21 and directly driven by a turbine 24. A cold turbine 28 is mechanically integral with the compressor 21 and is provided with an adjustable distributor 29. Furthermore, a cold turbine 25 is mechanically integral with the compressors 23a and 23b and is provided with an adjustable distributor 26. The cold turbine 25 is located upstream of the flow division point of the high pressure dual flow turbine.

Figure 7:
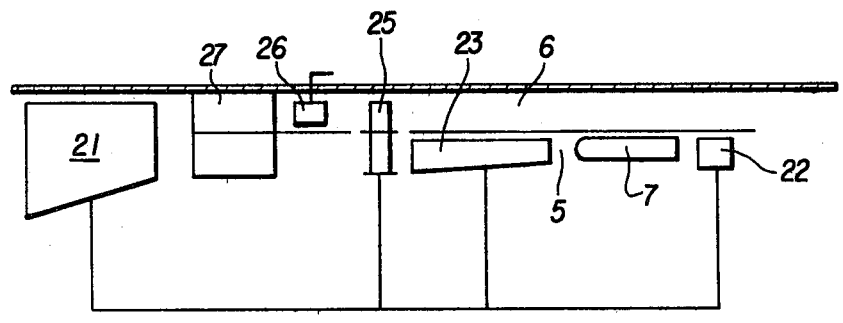
FIG. 7 is a half sectional view of an embodiment of the turbojet shown in FIG. 5.

FIG. 7 represents another embodiment of a turbojet in which the low pressure compressor 21 and the high pressure compressor 23 as well as the cold turbine 25 are driven by a turbine 22 and form only a single driven spool.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of The United States is:

1. A multiple flow turbojet with an adjustable bypass ratio for a fluid, said turbojet comprising a housing containing:
   a low pressure rotary spool including at least one turbine and one compressor;
   a high pressure rotary spool including at least one turbine and one compressor;
   burner means acting on the turbine of at least said high pressure spool;
   a primary fluid path defined by said low and high pressure spools and said burner means;
   a secondary fluid path radially outside of said primary fluid path;
   at least one vane in said secondary fluid path, said vane mechanically integral with said high pressure spool and interacting with said fluid; and
   at least one adjustable guide means in said secondary fluid path;
   whereby the ratio of fluid flow characteristics in said primary and second fluid paths is varied as a function of the setting of said at least one guide means.

2. The turbojet of claim 1 comprising a bypass high pressure compressor wherein the fluid in said secondary fluid path is compressed by said bypass high pressure compressor and expanded by a cold turbine located at the periphery of said low pressure turbine, said cold turbine being located in said secondary fluid path and including said guide means.

3. The turbojet of claim 1 comprising a low pressure bypass compressor, and wherein the fluid in said secondary fluid path is compressed by said bypass low pressure compressor and expanded by a cold turbine located at the periphery of the blades of said high pressure turbine, said cold turbine located in said secondary fluid path and including said guide means.

4. The turbojet of claim 1 comprising a bypass high pressure compressor, and wherein the fluid in said secondary fluid path is compressed by said bypass high pressure compressor and successively expanded by a cold turbine located at the periphery of said high pressure turbine and a cold turbine located at the periphery of said low pressure turbine, said cold turbines located in said secondary fluid path and each including said guide means.

5. The turbojet of claim 1 comprising a bypass low pressure compressor, and wherein the fluid in said secondary fluid path is compressed by said high pressure compressor and expanded by a cold turbine mechanically connected to said high pressure casing and located in said secondary fluid path downstream from said high pressure compressor, said cold turbine including said guide means.

6. The turbojet of claim 5 including a second cold turbine located at the periphery of said low pressure turbine, said second cold turbine located in said secondary fluid path and also including said guide means.

* * * * *